United States Patent
Hampson et al.

(10) Patent No.: US 9,665,157 B2
(45) Date of Patent: May 30, 2017

(54) SYSTEM AND METHOD FOR DEFERRING POWER CONSUMPTION BY POST-PROCESSING SENSOR DATA

(71) Applicant: QUALCOMM Incorporated, San Diego, CA (US)

(72) Inventors: Terence William Hampson, North York (CA); Evan Robert Hildreth, Thornhill (CA); Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 14/253,107

(22) Filed: Apr. 15, 2014

(65) Prior Publication Data

US 2015/0293575 A1   Oct. 15, 2015

(51) Int. Cl.
*G06F 1/32* (2006.01)

(52) U.S. Cl.
CPC ............ *G06F 1/3212* (2013.01); *G06F 1/329* (2013.01); *G06F 1/3293* (2013.01); *Y02B 60/1292* (2013.01); *Y02B 60/144* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 8,255,720 B1 | 8/2012 | Conway | |
| 8,264,328 B2 | 9/2012 | Blackadar | |
| 2004/0046873 A1* | 3/2004 | Kubo | H04N 1/2112 348/222.1 |
| 2004/0257462 A1* | 12/2004 | Goris | H04N 5/232 348/372 |
| 2005/0108075 A1 | 5/2005 | Douglis et al. | |
| 2008/0165714 A1* | 7/2008 | Dettinger | H04W 52/0261 370/311 |
| 2008/0200220 A1 | 8/2008 | Jackson | |
| 2012/0088556 A1 | 4/2012 | Tupman et al. | |
| 2012/0115552 A1 | 5/2012 | Bhattacharya | |
| 2012/0286960 A1* | 11/2012 | Blackadar | A61B 5/11 340/636.15 |
| 2013/0144968 A1 | 6/2013 | Berger | |

(Continued)

OTHER PUBLICATIONS

International Search Report and Written Opinion—PCT/US2015/024917—ISA/EPO—Jul. 28, 2015.

*Primary Examiner* — Kim Huynh
*Assistant Examiner* — Joshua Neveln

(57) ABSTRACT

Systems and methods for determining a battery-level of an electronic device and conserving the battery charge of the electronic device are disclosed. The battery consumption of an electronic device may be reduced when the user or the device learns via user input or determines via prediction that the battery will be depleted before the next possible charge cycle. Reducing battery consumption could be accomplished by accessing an application requiring less power consumption and/or delaying post-processing of sensor data related to that application, for example a camera application. Prediction of battery life could include determining the time to the next expected battery charge and delaying the processing of sensor data until the electronic device is plugged in and charging or has reached a predetermined charge level.

31 Claims, 6 Drawing Sheets

(56) References Cited

U.S. PATENT DOCUMENTS

2013/0229491 A1  9/2013 Kim et al.
2013/0235226 A1* 9/2013 Karn ................. H04N 5/23241
                                             348/220.1

* cited by examiner

SYSTEM AND METHOD FOR DEFERRING POWER CONSUMPTION BY POST-PROCESSING SENSOR DATA

BACKGROUND

Field of the Invention

The systems and methods disclosed herein relate generally to preserving battery charge and particularly to deferring power consumption of an electronic device to a later time by post-processing sensor data.

Description of the Related Art

In today's fast moving technology development for the mobile sector, user experience and battery life are two of the most important metrics of an electronic device, for example a mobile phone. Some applications run on an electronic device, for example camera applications, can rapidly deplete battery charge. Depletion of the battery charge may result in failure of the electronic device, which can inconvenience the user. Actively managing the power consumption of a feature or application may add value to the system by contributing to longer battery life through smarter use of features. In addition, by customizing the response of a mobile device based on a more context-aware method or system the device can deliver a more compelling user experience.

SUMMARY

The systems, methods and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

Embodiments and innovations described herein relate to systems and methods that may be run in a processor for an electronic device for deferring battery consumption when the user or the device learns or knows that the battery will be depleted before the next possible charge cycle. Deferring battery consumption to a later time could be accomplished by accessing an application requiring less power consumption and/or delaying post-processing of sensor data related to that application, for example an image or video capture application or an audio application. Aspects of the disclosure also relate to the prediction of battery life of an electronic device. Prediction of battery life could include determining the time to the next expected battery charge and delaying the processing of sensor data until the electronic device is plugged in and charging or has reached a predetermined charge level. Other aspects of the disclosure relate to processes, applications, daemons, and libraries that could be modified depending on the mode of operation of the electronic device.

As discussed below, some embodiments incorporate a look-up table to control which application is launched when the user selects the application icon. A person of skill in the art will appreciate that other embodiments could be used to control which application is launched for a given battery life condition.

One innovation relates to systems and methods for reducing power consumption of an electronic device when a user, or the device, knows that the battery will be depleted before the next possible charge cycle. For example, some methods to reduce battery consumption can include determining whether a full-power or reduced-power version of an application is run and/or delaying the post-processing of sensor data to a time when conserving power is not an issue.

One aspect relates to a system for deferring power consumption of an electronic device. The system includes a memory component configured to store sensor data and a processor coupled to the memory component. The processor is configured to retrieve the sensor data from the memory component and perform processing of the sensor data in at least two operational modes including a sensor data processing normal power operation mode and a sensor data processing low power operation mode, the low power operation mode consuming less power than the normal power operation mode. The system also includes a control module stored in the memory component. The control module includes instructions configured to operate the processor to determine a low power condition that is based on at least one of a threshold battery charge level below which the electronic device will enter the low power operation mode or a threshold time after which the device will enter the low power operation mode and operate the device in the low power operation mode based on whether the low power condition occurs. Operating the device in the low power operation mode includes storing sensor data in the memory component and performing less processing of the sensor data than when the device is operated in the normal power operation mode. The system further includes an imaging device in communication with the processor and configured to generate image data, the imaging device including at least one imaging sensor. The control module is further configured to accept user preferences for a low power operation mode of the electronic device. The control module is further configured to, when in the low power operation mode, store the sensor data in the memory component for later processing. The control module is further configured to store the sensor data for delayed high quality post-processing during a later charging cycle of the electronic device. The low power operation mode may include operating a camera application for a light-field or plenoptic camera. The low power operation mode may include operating a camera application for a stereoscopic camera. The low power operation mode may include operating a heart rate monitor application. The low power operation mode may include operating an audio application. The low power operation mode may include operating a camera application for a mobile device.

In another aspect, a method for deferring power consumption of an electronic device includes the steps of storing sensor data in a memory component of the electronic device, retrieving the sensor data from the memory component and performing processing of the sensor data in at least two operational modes including a sensor data processing normal power operation mode and a sensor data processing low power operation mode, the low power operation mode consuming less power than the normal power operation, determining a low power condition that is based on at least one of a threshold battery charge level below which the electronic device will enter the low power operation mode or a threshold time after which the device will enter the low power operation mode, and operating the device in the low power operation mode based on whether the low power condition occurs. Operating the device in the low power operation mode may include storing the sensor data in the memory component and performing less processing of the sensor data than when the device is operated in the normal power operation mode. The method may further include the step of accepting user preferences for a low power operation mode of the electronic device. The method may further include the step of storing the sensor data in the memory component for later post-processing during low power operation of the electronic device. The method may further include the step of storing the sensor data in the memory component of the electronic device for delayed post-processing during a later charging cycle of the electronic device. The low power operation mode may include operating a camera application for a light-field or plenoptic camera. The low power operation mode may include operating a camera application for a stereoscopic camera. The low power operation mode may include operating a heart rate monitor application. The low power operation mode may include operating an audio application. The low power operation mode may include operating a camera application for a mobile device.

In yet another, an apparatus for deferring power consumption of an electronic device may include means for storing sensor data, means for retrieving the sensor data from the memory component and performing processing of the sensor data in at least two operational modes including a sensor data processing normal power operation mode and a sensor data processing low power operation mode, the low power operation mode consuming less power than the normal power operation, means for determining a low power condition that is based on at least one of a threshold battery charge level below which the electronic device will enter the low power operation mode or a threshold time after which the device will enter the low power operation mode, and means for operating the device in the low power operation mode based on whether the low power condition occurs.

In another aspect, a non-transitory computer-readable medium stores instructions that, when executed, cause at least one physical computer processor to perform a method of deferring power operation of an electronic device. The method may include the steps of storing sensor data in a memory component of the electronic device, retrieving the sensor data from the memory component and performing processing of the sensor data in at least two operational modes including a sensor data processing normal power operation mode and a sensor data processing low power operation mode, the low power operation mode consuming less power than the normal power operation, determining a low power condition that is based on at least one of a threshold battery charge level below which the electronic device will enter the low power operation mode or a threshold time after which the device will enter the low power operation mode, and operating the device in the low power operation mode based on whether the low power condition occurs. Operating in the low power operation mode may include storing sensor data in the memory component and performing less processing of the sensor data than when the device is operated in the normal power operation mode. The method may further include accepting user preferences for the low power operation mode of the electronic device. The method may further include storing the sensor data in the memory component for later processing. The method may further include storing the sensor data in the memory component for delayed high quality post-processing during a later charging cycle of the electronic device. The low power operation mode may include operating a camera application for a light-field or plenoptic camera. The low power operation mode may include operating a camera application for a stereoscopic camera. The low power operation mode may include operating a heart rate monitor application. The low power operation mode may include operating an audio application.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
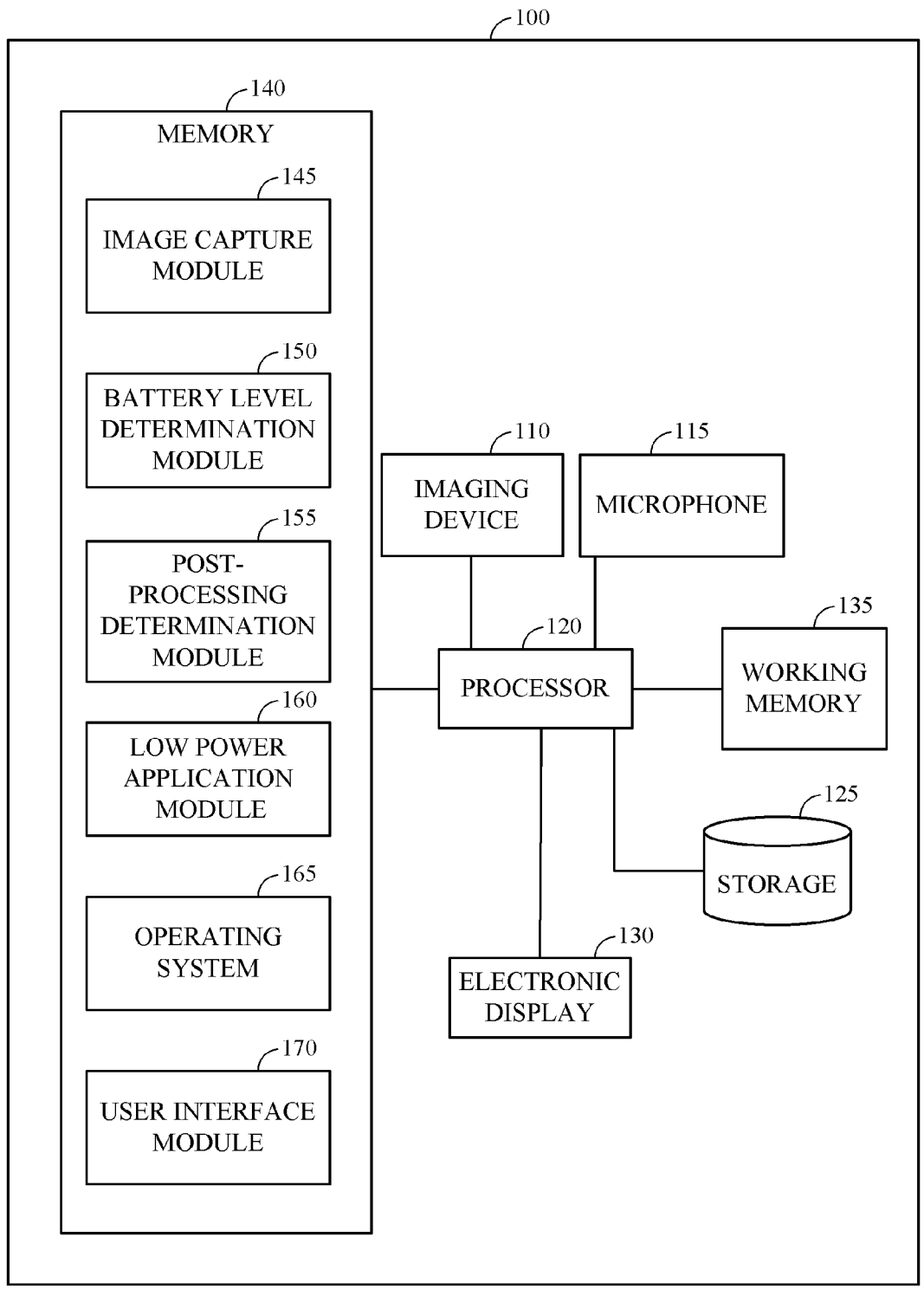
FIG. 1 is a block diagram depicting a system implementing some operative elements for reducing power consumption of an electronic device.

Depletion of battery charge can be an issue or inconvenience for a user of an electronic device. At times, circumstances may prevent a user from timely recharging the electronic device, for example when the user is traveling or actively away from a charging station. Prolonged use of the electronic device without access to charging facilities can result in depletion of the battery before the user is able to recharge the device. The methods and systems discussed below provide solutions to reduce or defer battery consumption in light of the anticipated timing of the next possible charge cycle.

In some embodiments, a device may include a power consumption deferment process that may include a configuration stage and a running stage. In the configuration stage, the device may provide an interface that receives a user selection of which features may be limited if the battery is low on charge. Additionally, during the configuration stage, the user interface of the device may allow the device to receive a user may selection of a threshold beyond which the device enters a low power mode. During the running stage, the electronic device has been instructed (or configured) to enter a low power mode. In the low power mode, the device may be configured to limit available features and/or functionality, run alternative low power applications, adjust which libraries are accessed, modify other processing functions including background processing (for example, daemons), or adjust any other function currently running on a processor of the device. In some embodiments, a processor of the electronic device may be instructed (or configured) to delay post-processing of sensor data until a time when the battery is recharged.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

System Overview

FIG. 1 illustrates one example of a power management system 100 configured to estimate the power consumption of an electronic device and implement power reduction strategies based on the estimated power consumption or battery level remaining. The illustrated embodiment is not meant to be limiting, but is rather illustrative of certain components in some embodiments. The power management system 100 may include a variety of other components for other functions which are not shown for clarity of the illustrated components.

The power management system 100 may include an imaging device 110 and an electronic display 130. Certain embodiments of electronic display 130 may be any flat panel display technology, for example an LED, LCD, plasma, or projection screen. Electronic display 130 may be coupled to a processor 120 for receiving information for visual display to a user. Such information may include, but is not limited to, visual representations of files stored in a memory location, software applications installed on the processor 120, user interfaces, and network-accessible content objects.

The imaging device 110 may include one or a combination of imaging sensors. The processor 120 of the power management system 100 can also be coupled to, and in data communication with, the imaging device 110. The power management system 100 can also include a working memory 135 and a program memory 140 also in communication with processor 120. The power management system 100 may be a mobile device, for example, a portable wireless device including but not limited to a tablet computer, a laptop computer, or a cellular telephone (for example a smartphone).

In some embodiments the processor 120 may be a general purpose processing unit, or in some embodiments the processor 120 may be specially designed for power management or image processing applications for a handheld electronic device. In some embodiments, processor 120 may include an image signal processor (ISP) used for digital processing of image data in digital cameras, mobile phones, or other devices having a camera. As shown, the processor 120 is connected to, and in data communication with, program memory 140 and a working memory 135. In some embodiments, the working memory 135 may be incorporated in the processor 120, for example, cache memory. The working memory 135 may also be a component separate from the processor 120 and coupled to the processor 120, for example, one or more RAM or DRAM components. In other words, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. The processor instructions may then be loaded into RAM to facilitate execution by the processor. For example, working memory 135 may be a RAM memory, with instructions loaded into working memory 135 before execution by the processor 120.

In the illustrated embodiment, the program memory 140 stores an image capture module 145, a battery level determination module 150, a post-processing determination module 155, a low power application module 160, operating system 165, and a user interface module 170. These modules may include instructions that configure the processor 120 to perform various image processing and device management tasks. Program memory 140 can be any suitable computer-readable storage medium, for example a non-transitory storage medium. Working memory 135 may be used by processor 120 to store a working set of processor instructions contained in the modules of memory 140. Alternatively, working memory 135 may also be used by processor 120 to store dynamic data created during the operation of power management system 100.

As mentioned above, the processor 120 may be configured by several modules stored in the memory 140. In other words, the process 120 can run instructions stored in modules in the memory 140. Image capture control module 145 may include instructions that configure the processor 120 to obtain images from the imaging device. Therefore, processor 120, along with image capture control module 145, imaging device 110, and working memory 135, represent one means for obtaining image sensor data.

Still referring to FIG. 1, memory 140 may also contain battery level determination module 150. The battery level determination module 150 may include instructions that configure the processor 120 to determine an amount of charge remaining in the electronic device, as will be described in further detail below. Therefore, processor 120, along with battery level determination module 150 and working memory 135, represent one means for estimating the amount of battery level or charge remaining on a battery of an electronic device.

Memory 140 may also contain post-processing determination module 155. The post-processing determination module 155 may include instructions that configure the processor 120 to perform limited post-processing or delay post-processing of acquired image data based on the amount of battery charge remaining. For example, if a battery charge remaining is less than a predetermined threshold level, or a threshold that is determined during operation, (for example, a dynamically determined threshold), the processor 120 may be instructed by the post-processing determination module 155 to delay post-processing functions, for example robust demosaic filtering, motion-stabilization, skin-tone correction, etc. Therefore, processor 120, along with battery level determination module 150, post-processing determination module 155, and working memory 135 represent one means for determining which post-processing functions to apply to an acquired image and when to apply such functions. In some embodiments, a dynamically determined threshold can be determined based on one or more factors, for example but not limited to, the rate of the battery depletion, how fast the battery has been depleted during previous usage, and/or what other processes are running on the electronic device or the processor. Such thresholds may be dynamically determined for limited post-processing or delay post-processing, or other processes and/or functionality described herein.

Memory 140 may also contain a low power application module 160. The low power application module 160 illustrated in FIG. 1 may include instructions that configure the processor 120 to switch from an application that consumes a large amount of power to an application that consumes a low amount of power based on the battery charge remaining. Some embodiments incorporate information in, for example, a look-up table, a file, a database, or in another hardware or software storage component (all of such components referred to as a look-up table for ease of reference) to control which application is launched when the user selects the application icon. In other embodiments, a running process could use a system property to identify whether to operate in a low-power or regular mode. The system property could include information about the current battery level, for example. The process could include an argument that could be passed in to determine the mode of operation. In some embodiments, if a battery charge remaining is less than a predetermined threshold level, the processor 120 may be instructed by the low power application module 160 to access the information stored in the look-up table that controls whether a low power or full power application is launched when the user selects the application icon, and launch the appropriate application. Therefore, processor 120, along with battery level determination module 150, low power application module 160, and working memory 135 represent one means for determining whether to launch a low power or full power application.

Memory 140 may also contain user interface module 170. The user interface module 170 illustrated in FIG. 1 may include instructions that configure the processor 120 to provide a collection of on-display objects and soft controls that allow the user to interact with the device. An operating system module 165 may also reside in memory 140 and operate with processor 120 to manage the memory and processing resources of the system 100. For example, operating system 165 may include device drivers to manage hardware resources for example the electronic display 130 or imaging device 110. In some embodiments, instructions contained in the battery level determination module 150 and post-processing determination module 155 may not interact with these hardware resources directly, but instead interact through standard subroutines or APIs located in operating system 165. Instructions within operating system 165 may then interact directly with these hardware components.

Processor 120 may write data to storage module 125. While storage module 125 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 1 depicts a device comprising separate components to include a processor, imaging device, electronic display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into power management system 100 or connected via an external device port. The processor instructions may then be loaded into RAM to facilitate execution by the processor. For example, working memory 135 may be a RAM memory, with instructions loaded into working memory 135 before execution by the processor 120.

Method Overview

Certain functionality of the examples of embodiments described herein relate to predicting how long the battery charge of an electronic device will last and from that prediction, performing full or limited functions on the electronic device, for example, launching and running a low-power or full-power application or performing full or limited post-processing of sensor data for example images. The examples may be described as a process, which may be depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Figure 2:
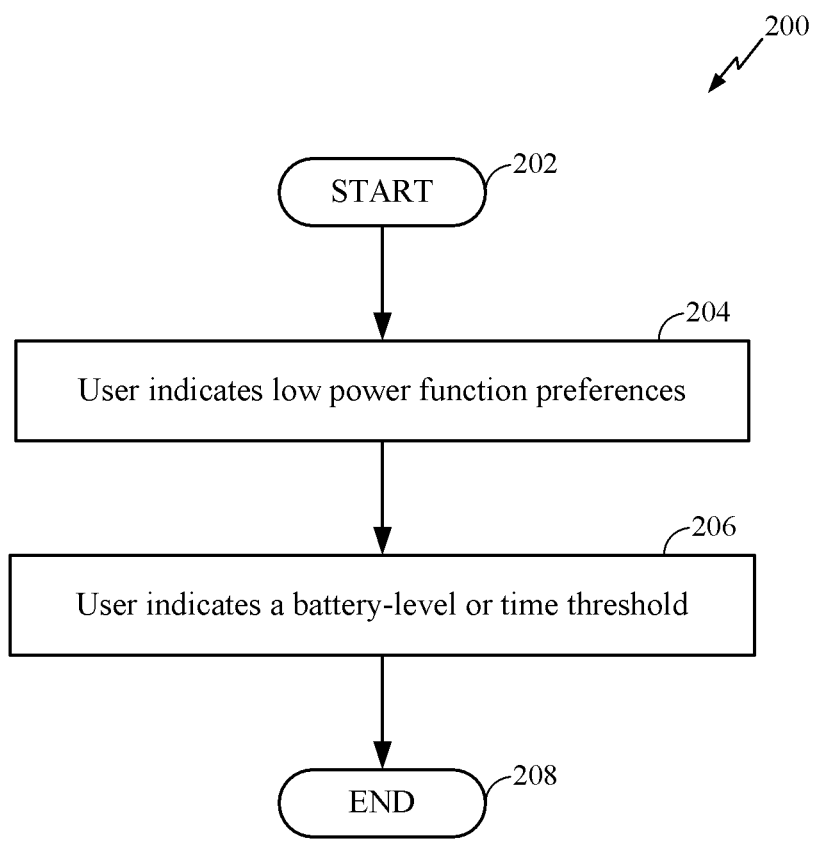
FIG. 2 is a flow chart illustrating a process for reducing power consumption of an electronic device by post-processing sensor data.
Figure 5:
FIG. 5 is an example of a user interface illustrating one embodiment of a photo gallery of an electronic device implementing delayed post-processing of sensor data.

FIG. 2 illustrates one embodiment of a process 200 to configure an electronic device into a low power or a full or normal power operation mode that may be implemented in one or more of the modules depicted in FIG. 1. The low power operating mode desirably consumes less power than the normal power operation mode. The electronic device may be a handheld communication device, e.g., a cellular phone or "smartphone," or a mobile personal data assistant (PDA) including a tablet computer. In some examples, the process 200 may be run on a processor, for example, processor 120 (FIG. 1), and on other components illustrated in FIG. 1 that are stored in memory 140 or that are incorporated in other hardware or software. The configuration process 200 begins at start block 202 and transitions to block 204 wherein the user first indicates one or more low power operation preferences. In some embodiments, the user may select which feature(s) of the electronic device may be limited during a low power operation. For example, the user may indicate that post-processing of sensor data, for example camera data acquired by an imaging device, for example imaging device 110 (FIG. 1) of the electronic device, may be delayed if the device is in a low power mode of operation. In another example, the user may indicate that a low power application, for example a less graphics-intensive game, may be launched during a low power mode of operation instead of the full game or more graphics-intensive version. In other embodiments, the electronic device may, by default, run low power applications and processes. In this implementation, the user may select which applications, features, or processes to be run in a regular or high power mode. For example, the user may indicate that full post-processing of an image is desired by selecting an image icon or text displayed in a photo gallery (as illustrated in FIG. 5 and discussed in greater detail below). The process 200 then transitions to block 206, wherein the user indicates a threshold beyond which the device has entered a "usable despite low power" mode. In some embodiments, the threshold could be a battery level threshold. The user may indicate, via a selection, a battery level threshold below which the device would enter a low power mode of operation. In some embodiments, the battery level threshold could be 30% battery charge, 25% battery charge, 20% battery charge, or any other user-defined threshold battery charge percentage. In other embodiments, the user may indicate a time threshold. A time threshold may represent the minimum amount of time the device must continue to function at the current power usage. For example, the user may indicate that the device needs to operate at the current power usage for a specified time to accommodate the user's travel plans, for example air travel. In another example, the user may indicate that the device needs to operate at the current power usage for a specified time to accommodate usage of the device while the user is at a business meeting. In another example, the user could indicate a time threshold when the user is at a theme park and will want to have use of the device to take photos or video for a specified length of time. Once the user has indicated a threshold, either battery-level or time or both, the process 200 transitions to block 208 and ends.

Figure 3:
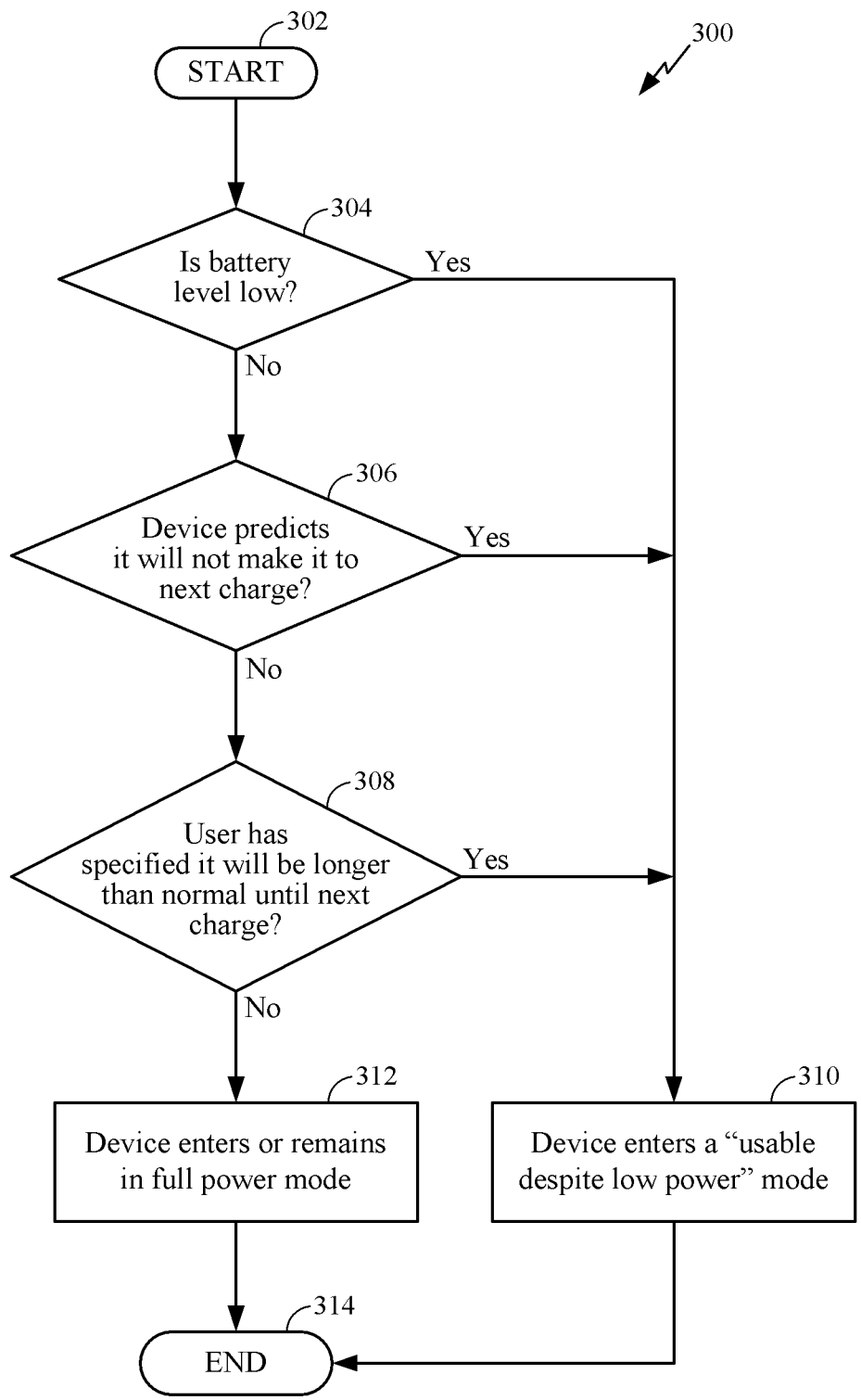
FIG. 3 is an example of a user interface depicting partial processing and delayed processing of image data to reduce power consumption.

After the configuration stage is complete, for example when process 200 is complete, in some embodiments the device may run a battery level determination process, for example process 300 shown in FIG. 3. Process 300 may be used in some embodiments to estimate the amount of battery life remaining in an electronic device or predict how long the battery charge of an electronic device will last. This prediction may be based on data representing historical usage and charging patterns of the electronic device or from location indications or other factors. In some examples, the process 300 may be run on a processor, for example processor 120 (FIG. 1), and on other components illustrated in FIG. 1 that are stored in memory 140 or that are incorporated in other hardware or software. The battery-level determination process 300 begins at start block 302 and transitions to block 304 wherein a decision is made as to the level of battery charge of the electronic device. If the battery level is low, as defined by a user-defined threshold established during the configuration process 200, process 300 transitions to block 310, wherein the device enters a "usable despite low power" mode. In this mode, features or applications may be limited or disabled, as identified by the user in the configuration process 200, described above. Additional details of operation of the device during a low-power mode will be discussed below. The process 300 then transitions to block 314 and ends.

If the battery level is not low, as defined by a user-defined threshold, or a dynamically determined threshold, the process 300 transitions to block 306, wherein the device predicts whether it will deplete the battery prior to the next charge. For example, if the user normally charges the device at 7 pm and the current time is 1 pm with 30% of battery charge left, the device may determine, based on historical usage records of the device, that the device will deplete the battery prior to the next charge cycle when operating at the current, full power usage mode. If this is true, the process 300 transitions to block 310, where, as discussed above, the device enters a "usable despite low power" mode and disables certain features or processes based on user preferences or device settings, as will be discussed below. The process 300 then transitions to block 314 and may end.

If the device predicts that it will not deplete the battery prior to the next anticipated charge cycle, the process 300 transitions to block 308, wherein a determination is made as to whether the user has specified that it will be longer than normal until the next charging cycle. For example, if the user is traveling and selects a longer time threshold in the configuration stage outlined in process 200 and/or a GPS reading from the electronic device indicates that the electronic device is away from the home area, the device may deplete the battery prior to the next charging cycle. In some embodiments, determining a battery level and power usage may include determining historical power usage or current power usage (for example, if the user is taking a large number of pictures in a short time frame). If this is true, the process 300 transitions to block 310, where, as discussed above, the device enters a "usable despite low power" mode and disables certain features or processes based on user preferences or device settings, as will be discussed below. The process 300 then transitions to block 314 and may end.

If the user has not specified that it will be longer than normal until the next charge cycle and the device has not determined that it will be longer than normal until the next charge cycle, the process 300 transitions to block 312, wherein the device enters or remains in a full power mode. In the full power mode, no limitation of features or delayed post-processing is instructed. The process 300 then transitions to block 314 and may end.

In some embodiments, prediction of time to the next charging cycle and determination of whether the device will deplete the battery prior to the next charge could be based on location information. For example, the user may be at home as determined by GPS coordinates and therefore is likely to recharge the device soon. In other embodiments, prediction of time to the next charging cycle could also be based on time and date information. For example, the user may typically charge the device at 7pm each evening. In other embodiment, prediction of time to the next charging cycle could be based on other historical device usage information.

Operation in Low-Power Mode

Figure 4:
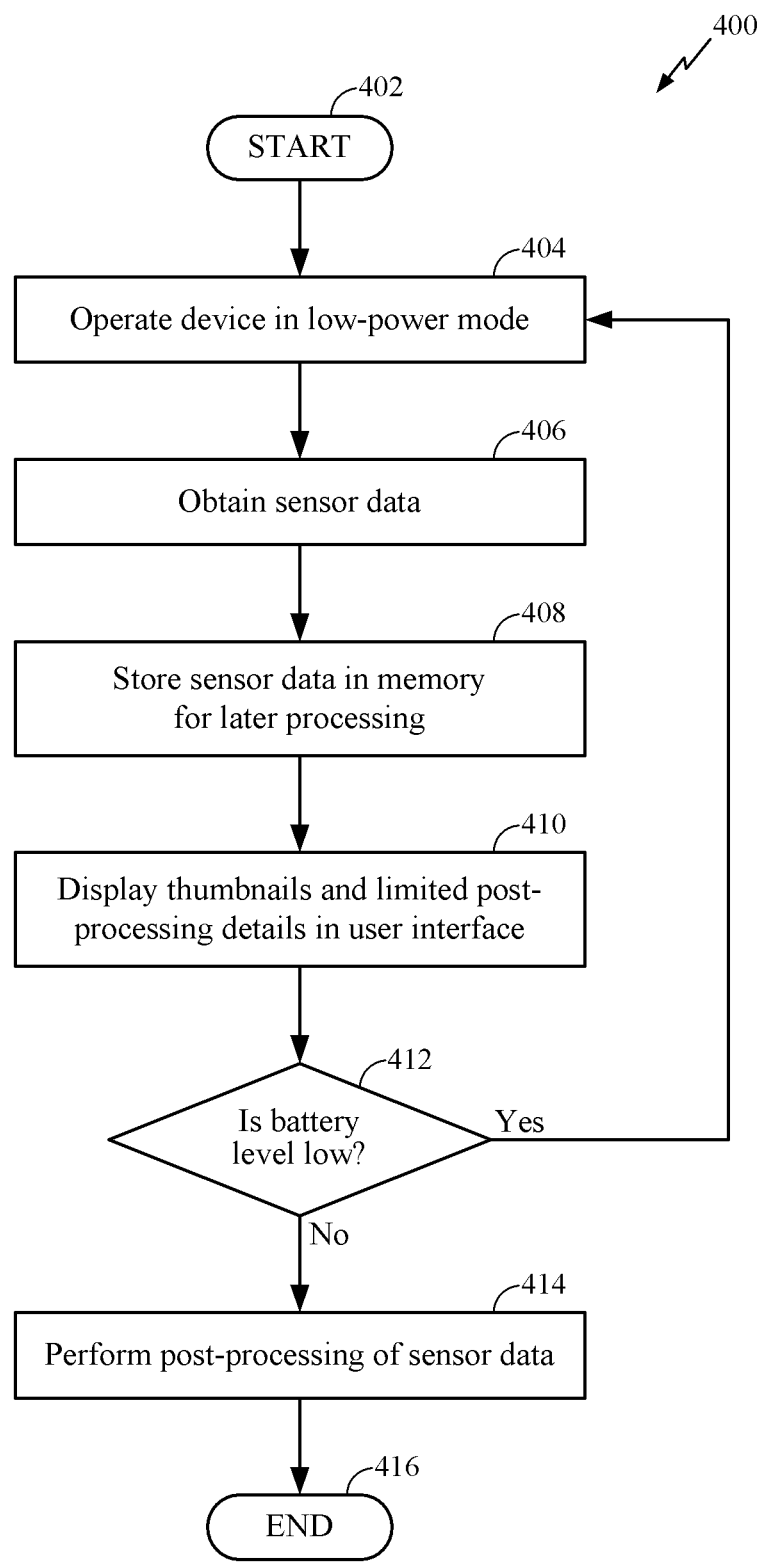
FIG. 4 is a flow chart illustrating a process for reducing power consumption of an electronic device by post-processing sensor data.

When the device has been alerted that power should be conserved, based on one of the battery-level determination steps of process 300, discussed above, the device may run a low-power operation process 400, one example of which is shown in FIG. 4. Operation in a low power operation mode desirably consumes less power than operation in a normal power operation mode. Process 400 may be used in some embodiments to delay post-processing of sensor data to a time when the device is plugged in or is fully charged. For example, if the user is at a theme park and taking multiple photos and videos without an opportunity to recharge the electronic device, the device may determine, using the battery-level determination process 300 described above, that the device may not have sufficient battery charge to continue to operate in a full power mode until the user can recharge the device. In this situation, the device may switch from a full-power mode, in which sensor data is post-processed shortly after acquisition, to a low-power mode, in which minimal post-processing is performed on the sensor data to conserve battery power such that the device can continue to operate until the user can recharge the device. In some embodiments, the device may run a low-power camera operation according to the steps outlined in the process 400. In some examples, the process 400 may be run on a processor, for example, processor 120 (FIG. 1), and on other components illustrated in FIG. 1 that are stored in memory 140 or that are incorporated in other hardware or software.

The low-power operation process 400 begins at start block 402 and transitions to block 404, wherein the device is operated in a low-power mode. For example, in some embodiments, an imaging device 110 and camera application may be operated in a low-power mode. In a low power operation mode, processes that utilize a large amount of power, for example image processing functions including auto white balance, CFA demosaicing, and storing the processed image as a JPEG, may be delayed until the battery of the device is fully charged or the device is plugged in. In some embodiments, operation in low power operation mode shuts down or bypasses high power consumption processes of the image signal processor of processor 120 that may be run during a normal power operation mode.

Figure 6:
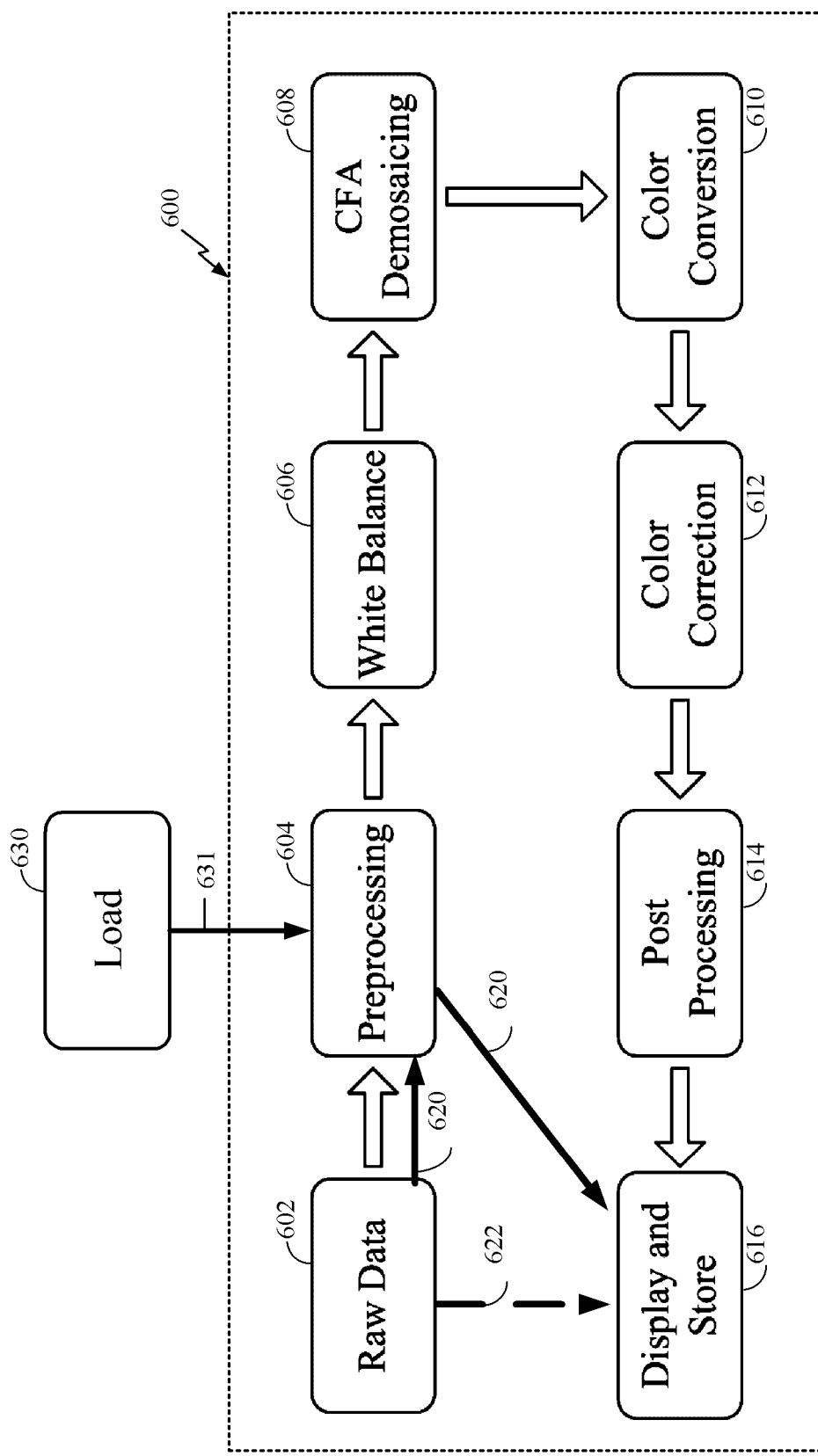
FIG. 6 is an example of an image processing pipeline that may be implemented shortened by an electronic device having a camera that can operate in a regular and low power mode.

The process 400 then transitions to block 406, wherein sensor data is obtained. The sensor data may include, for example, still image data or video image data acquired by an imaging device 110, audio data acquired by a microphone 115, or any other additional sensor data for example temperature or pressure. In other embodiments, other sensor data may also be obtained. The process 400 then transitions to block 408, wherein the sensor data is stored in a memory for later processing. Using a camera application as an example, in some embodiments, the low-power application system may configure the imaging device 110 through the API to capture the raw image data and store the data in memory, for example memory 125 for processing at a later time. For example, the low-power camera application may not utilize a view-finder, run auto white balance, run auto focus, or process the raw BGGR Bayer data immediately. Unlike a full-power camera application that may process the raw BGGR data using the camera's image processing pipeline and store the image data as a JPEG file in memory, the raw BGGR data acquired by the imaging device 110 may be stored in memory and processed at a later time. One example of a generic image data processing pipeline 600 that may be bypassed when the device is in a low power operation mode is shown in FIG. 6. Typically, during a normal power operation mode of an imaging system, significant preprocessing and post-processing is performed on the sensor data acquired by the image sensor. This typical processing operation is illustrated in FIG. 6.

In a full or normal power operation mode, the pipeline 600 receives raw image data 602 from the camera sensor and preferably performs full post-processing of the image data. This post-processing may include white balancing the image data 606, CFA demosaicing 608, color conversion 610, and color correction of the image data 612 before storing the image data to memory 616. This typical process is indicated by the white arrows in FIG. 6. As discussed above, these processing steps consume battery power and may be bypassed as discussed with respect to process 400 to conserve battery power. For example, during a low power operation mode, the device may bypass one or more steps of the full image processing pipeline shown in FIG. 6. In one embodiment, in one embodiment of a low power operation mode, the processor may be instructed to perform limited preprocessing 604 of the raw image data 602 and then save the image data to memory 616, as indicated by the solid black lines 620 in FIG. 6. In another embodiment, when a device is operating in another embodiment of a low power operation mode, the processor may be instructed to immediately store the raw image data without performing any processing of the raw image data, as indicated by the dashed line 622 in FIG. 6. A command to post-process the image data, for example a direct command from the user or an instruction received by the processor 120 to enter a high or normal power operation due to the device reaching or exceeding a battery level threshold, may trigger instructions to the processor 120 to inject the sensor data back into the image signal processor (ISP) for post-processing. Once injected back into the ISP for post-processing, the sensor data may be fully processed as indicated in FIG. 6 by the white arrows.

In some embodiments, a thumbnail photo could be processed and displayed in the photo gallery of an electronic device while higher-quality processing using a more robust demosaic filter, a motion-stabilization filter, skin-tone correction filter, etc. is performed when the device is charging or when the user manually selects a picture for sharing. In one example, a photo gallery of an electronic device, for example a mobile phone, may display text to the user indicating delayed post-processing of image data based on battery charge level, as shown in FIG. 5. For example, to produce a camera preview picture, the image data may be processed in a reduced quality at the time the photo is taken to produce a temporary image. The temporary image may be formed by reducing the resolution of the displayed images using, for example, a nearest-neighbor Bayer-pattern demosaic filter, or another image resolution process. This temporary image may be displayed in a user's photo gallery as shown in FIG. 5. The photo gallery may display instructional text to the user indicating that the image will be displayed when the device is plugged in or fully charged. However, in other embodiments, the user may select the text or icon indicating that the image data has not been post-processed to demand full post-processing of the image so that the image can be emailed, uploaded to a website, etc. This will direct the system to post-process the image and display a thumbnail image in the photo gallery in place of an icon or text indicating that the image data has not been fully post-processed.

In another example, a microphone, for example microphone 115, may be used to capture raw audio data. If the device is in a low power mode, the system can store the raw audio data in a memory storage, for example memory 125, for later post-processing at a time when battery charge is full, the device is plugged in and charging, or upon user demand.

In yet another example, an imaging sensor, for example imaging sensor 110, may record raw video data. If the device is in a low-power mode, the system can store the raw video data in a memory storage, for example memory 125, for processing at a time when the battery charge of the device is full, the device is plugged in and charging, or upon user demand.

The process 400 then transitions to block 412, wherein a decision is made as to whether the battery level of the electronic device is low. If the battery level is low, the process 400 transitions to block 404 and the process repeats as discussed above. However, if the device is charged or is plugged in and being charged, the process 400 transitions to block 414, wherein the device can then perform post-processing of raw image data. Post-processing could include applying a more robust demosaic filter, applying a motion-stabilization filter, applying a skin-tone correction filter, along with other post-processing filters and functions. Post-processing could include loading image data from memory and providing image data to the image signal processor (ISP). In one embodiment, the processor may be instructed to load the raw image data 630 and insert the raw image data 630 into the pipeline 600, as indicated by the line 631 in FIG. 6. The process 400 then transitions to block 416 and ends.

In some embodiments, post-processing of the sensor data may also be initialized if the user manually initiates an action that requires the full quality version of the data even when the battery level is low. For example, the device may perform higher-quality post-processing of the image data if the user attempts to email the image.

In some embodiments, if the battery level is below a user-defined threshold or the device predicts it is not going to have enough charge to last until the next charging cycle, the system can change the look-up table (LUT) that defines which application is launched when the user clicks the application icon. In other embodiments, a running process could use a system property to identify whether to operate in a low-power or regular mode. In some embodiments, the system property could include a battery level indication. The process could include an argument that could be passed in to determine the mode of operation. For example, when the system is in a low power situation, a low-power version of an application for example a camera could be launched. In other embodiments, a low-power version of a gaming application could also be launched when the device is in a low-power mode. The low-power version of these applications could include a shorter game and/or less complex graphics. When the battery level is above a defined threshold or the device is charged, the LUT could be changed so that the application that is launched when the user selects the application icon is the full-power operation application.

In another example, the processor of an electronic device (for example processor 120) could receive instructions to operate a display of an electronic device (for example electronic display 130) in a low-power mode. In some embodiments, during a low-power mode of operation, a color format could be changed or the frames per second (fps) could be reduced to conserve battery power. For example, changing from a color format of RGBX8888 at 60 fps to a color format of RGB565 at 30 fps could reduce the amount of bandwidth consumed by a display processing pipeline. Additionally, this color format change and fps reduction could reduce the clock rate at which the hardware operates. In some embodiments incorporating AMOLED displays, the pixels of the electronic display could be dimmed to conserve battery power. In other embodiments, a screen resolution of the electronic display could be adjusted. For example, a 720p screen could display at a lower resolution such that part of the viewing surface of the electronic display is black.

Embodiments of this predictive battery life and delayed post-processing approach could be implemented on mobile devices for example phones, cameras (including plenoptic or light-field cameras and stereo cameras), tablets, computers, heart rate monitors, etc. These examples are meant to be illustrative and are not limiting.

Clarifications Regarding Terminology

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Those having skill in the art will further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for deferring power consumption of an electronic device, comprising:
   a memory component configured to store data including instructions to operate an imaging device in at least two sensor data processing operational modes including a normal power operation mode and a low power operation mode, the low power operation mode consuming less power than the normal power operation mode;
   a processor coupled to the memory component, the processor configured to
      receive raw sensor data from the imaging device;
      determining whether a low power condition exists by
         determining whether a charge of a battery powering the electronic device is below a first threshold level, and
         predicting whether the charge of the battery will be below a second threshold level within a determined timeframe;
      in response to determining a low power condition of the system exists, operate the electronic device in the low power operation mode, and in the low power mode store the raw sensor data in the memory component without processing the raw sensor data; and
      in response to determining a low power condition does not exist, operate the electronic device in the normal power mode, and in the normal power mode:
         perform processing of the raw sensor data, and
         store the processed sensor data in the memory component.

2. The system of claim 1, further comprising an imaging device in communication with the processor and configured to generate sensor data, the imaging device comprising at least one imaging sensor.

3. The system of claim 1, wherein the processor is further configured to accept user preferences for a low power operation mode of the electronic device.

4. The system of claim 1, wherein the processor is further configured to store the sensor data for delayed high quality post-processing during a later charging cycle of the electronic device.

5. The system of claim 1, wherein the low power operation mode includes operating a camera application for a stereoscopic camera.

6. The system of claim 1, wherein the low power operation mode includes operating a camera application on the electronic device.

7. The system of claim 1, wherein the processor is further configured to determine that a low power condition exists based on a threshold battery charge level.

8. The system of claim 1, wherein in the normal power mode, processing of the raw sensor data includes demosaicing the raw sensor data.

9. The system of claim 1, wherein predicting whether the charge of the battery will be below the second threshold level within the determined timeframe is based on location information indicating where the electronic device is located.

10. The system of claim 1, wherein predicting whether the charge of the battery will be below the second threshold level within the determined timeframe is based on historical charging patterns of the electronic device.

11. The system of claim 10, wherein predicting whether the charge of the battery will be below the second threshold level within the determined timeframe is further based on historical usage records of the electronic device.

12. A method for deferring power consumption of an electronic device, comprising:
   receiving raw sensor data;
   performing processing of the raw sensor data in one of at least two sensor data processing operational modes including a sensor data processing normal power operation mode and a sensor data processing low power operation mode, the low power operation mode consuming less power than the normal power operation, by at least:
      determining whether a low power condition exists by
         determining whether a charge of a battery powering the electronic device is below a first threshold level, and
         predicting whether the charge of the battery will be below a second threshold level within a determined timeframe;
      in response to determining a low power condition of the system exists, operating the electronic device in the low power operation mode, and in the low power mode storing the raw sensor data in the memory component without processing the raw sensor data; and
      in response to determining a low power condition does not exist, operating the electronic device in the normal power mode, and in the normal power mode processing the raw sensor data; and
         storing the processed sensor data in the memory component.

13. The method of claim 12, further comprising accepting user preferences for a low power operation mode of the electronic device.

14. The method of claim 12, further comprising storing the sensor data in the memory component of the electronic device for delayed post-processing during a later charging cycle of the electronic device.

15. The method of claim 12, wherein the low power operation mode includes operating a camera application for a stereoscopic camera.

16. The method of claim 12, wherein the low power operation mode includes operating a camera application on the electronic device.

17. The method of claim 12, further comprising determining that a low level power condition exists.

18. The method of claim 17, wherein the low level power condition is based on a threshold battery charge level.

19. The method of claim 12, wherein in the normal power mode, processing the raw sensor data includes demosaicing the raw sensor data.

20. The system of claim 12, wherein predicting whether the charge of the battery will be below the second threshold level within the determined timeframe is based on location information indicating where the electronic device is located.

21. The system of claim 12, wherein predicting whether the charge of the battery will be below the second threshold level within the determined timeframe is based on historical charging patterns of the electronic device.

22. The system of claim 21, wherein predicting whether the charge of the battery will be below the second threshold level within the determined timeframe is further based on historical usage records of the electronic device.

23. An apparatus for deferring power consumption of an electronic device, comprising:
　means for storing data;
　means for receiving raw sensor data from an imaging device;
　means for performing processing of the raw sensor data in a determined mode of at least two sensor data processing operational modes including a sensor data processing normal power operation mode and a sensor data processing low power operation mode, the low power operation mode consuming less power than the normal power operation, the means for performing processing of the sensor data using the low power operation mode when a low power condition exits,
　means for determining whether a low power condition exists by
　　determining whether a charge of a battery powering the electronic device is below a first threshold level, and
　　predicting whether the charge of the battery will be below a second threshold level within a determined timeframe;
　wherein operating in the low power operation mode includes storing the raw sensor data in the means for storing data without processing the raw sensor data; and
　wherein operating in the normal power operation mode includes
　　processing the raw sensor data; and
　　storing the processed sensor data in the means for storing data.

24. The apparatus of claim 23, wherein in the normal power mode, processing the raw sensor data includes demosaicing the raw sensor data.

25. A non-transitory computer-readable medium storing instructions that, when executed, cause at least one physical computer processor to perform a method of deferring power operation of an electronic device, the method comprising:
　receiving raw sensor data;
　accessing instructions for performing processing of the raw sensor data in at least two sensor data processing operational modes including a sensor data processing normal power operation mode and a sensor data processing low power operation mode, the low power operation mode consuming less power than the normal power operation;
　determining whether a low power condition exists by
　　comparing whether a charge of a battery powering the electronic device is below a first threshold level, and
　　determining whether the charge of the battery will be below a second threshold level within a determined timeframe;
　in response to determining a low power condition of the system exists, operating the electronic device in the low power operation mode, and in the low power mode storing the raw sensor data in the memory component without processing the raw sensor data; and
　in response to determining a low power condition does not exist, operating the electronic device in the normal power mode, and in the normal power mode
　　processing the raw sensor data, and
　　storing the processed sensor data in the memory component.

26. The non-transitory computer-readable medium of claim 25, further comprising accepting user preferences for the low power operation mode of the electronic device.

27. The non-transitory computer-readable medium of claim 25, wherein the low power operation mode includes operating a camera application for a stereoscopic camera.

28. The system of claim 25, wherein in the normal power mode, processing the raw sensor data includes demosaicing the raw sensor data.

29. The system of claim 25, wherein predicting whether the charge of the battery will be below the second threshold level within the determined timeframe is based on location information indicating where the electronic device is located.

30. The system of claim 25, wherein predicting whether the charge of the battery will be below the second threshold level within the determined timeframe is based on historical charging patterns of the electronic device.

31. The system of claim 30, wherein predicting whether the charge of the battery will be below the second threshold level within the determined timeframe is based on historical usage data of the electronic device.

* * * * *